(12) United States Patent
Kay

(10) Patent No.: US 7,554,223 B1
(45) Date of Patent: Jun. 30, 2009

(54) MAGNETOHYDRODYNAMIC ENERGY CONVERSION DEVICE USING A HEAT EXCHANGER

(76) Inventor: Thomas P. Kay, 18 Livingston Ct., Woodstock, NY (US) 12498

( * ) Notice: Subject to any disclaimer, the term of this patent is extended or adjusted under 35 U.S.C. 154(b) by 396 days.

(21) Appl. No.: 11/478,065

(22) Filed: Jun. 29, 2006

Related U.S. Application Data

(60) Provisional application No. 60/789,073, filed on Apr. 5, 2006.

(51) Int. Cl.
*H02K 44/08* (2006.01)
(52) U.S. Cl. .......................................... 310/11; 290/52
(58) Field of Classification Search ................... 310/11, 310/300; 322/2 A, 2 R, 35, 47; 290/1 R, 290/2, 4 R, 4 D, 52; 60/641.8, 641.11–641.12, 60/641.15; 126/270, 634, 684
See application file for complete search history.

(56) References Cited

U.S. PATENT DOCUMENTS

| | | | | |
|---|---|---|---|---|
| 4,465,964 A | * | 8/1984 | Cover ........................... | 322/2 R |
| 4,523,113 A | * | 6/1985 | Kallman ...................... | 310/11 |
| 4,571,534 A | * | 2/1986 | Cover ........................... | 322/2 R |
| 4,800,727 A | * | 1/1989 | Petrick ......................... | 60/649 |
| 5,056,593 A | * | 10/1991 | Hull ............................. | 165/111 |
| 5,633,541 A | * | 5/1997 | Hayes ........................... | 310/11 |

* cited by examiner

*Primary Examiner*—Tran N Nguyen
(74) *Attorney, Agent, or Firm*—Levine & Mandelbaum

(57) ABSTRACT

An energy conversion device for generating electricity includes a heat exchanger adapted to receive heat from a heat source. A closed magnetohydrodynamic (MHD) circuit includes a section for extracting heat from a heat exchanger so as to raise the temperature of the flowable electrically conductive material within the MHD circuit. The heat exchanger includes a heat-conductive support adapted to be heated, and a heat-extracting section of the MHD circuit extracts heat from the support. The support may be a metal plate having a sinuous pipe arrangement in heat-conductive contact against each face, one of these pipe arrangements being part of a circuit for heating the plate and the other pipe arrangement being part of the MHD circuit. The heat source may be combustion of a fuel, solar, geothermal, chemical reaction, or waste heat in the form of a hot gas. The heat conductive support may be a metal tube heated, usually by a hot gas, in which case the heat-extracting section of the MHD circuit includes a helical pipe surrounding the tube. The heat-providing means may include a lens arrangement for concentrating solar radiation on one face of the heat exchanger plate.

17 Claims, 2 Drawing Sheets

MAGNETOHYDRODYNAMIC ENERGY CONVERSION DEVICE USING A HEAT EXCHANGER

BACKGROUND OF THE INVENTION

This invention relates to magnetohydrodynamic (MHD) energy conversion devices capable of converting heat directly into electrical energy.

As is well known, in an MHD conversion device, an electrically-conductive ionized gas flows through a magnetic field perpendicular to the direction of gas flow. This action generates an electric current in the gas, which is tapped by electrodes located in the magnetic field and in contact with the moving gas. One way of obtaining the electrically-conductive gas is to heat an ionizable working substance, such as cesium to produce the working fluid. Examples of MHD devices used to convert solar and laser energy into electricity are illustrated and described in U.S. Pat. Nos. 4,191,901 and 4,275,318.

A problem presented by MHD energy conversion devices of the prior art is that they tend to have limited versatility in the heat sources they can use for the energy conversion, and in the locations where they can be installed. This is due, in part, to the way in which heat energy is imparted to the working fluid.

BRIEF SUMMARY OF THE INVENTION

Therefore, it is an object of the present invention to provide an MHD energy conversion device wherein the working fluid is heated in a simple, relatively inexpensive, and straightforward manner.

It is another object of the invention to provide such a device employing a heat exchanger for transferring adequate heat to ionize the working fluid.

According to the present invention, any heat source, such as solar, geothermal, combustion of a fuel, e.g., oil, coal, or natural gas, chemical reaction, or even waste heat can be used for direct conversion to electricity by an MHD technique. Instrumental to operation of the invention is the use of a heat exchanger for transmitting heat from the heat source to the working fluid of the MHD conversion device. More specifically, the invention contemplates use of a support fabricated of a material having good thermal conduction properties. The support is heated by energy from whatever heat source is employed, and the support transmits the heat to the working fluid of the MHD device.

Typically, an effort is made to use a heat source capable of elevating the temperature of the working fluid as high as possible, since higher temperatures result in greater ionization of the working material and hence increased electrical output. However, it is believed that relatively low temperatures (e.g., 800° F.) can be useful since they will produce sufficient ionization to be practical for producing electricity, especially when the heat source is inexpensive or substantially free (e.g., solar or waste heat).

BRIEF DESCRIPTION OF THE DRAWINGS

The invention will be described in more detail with reference to the accompanying drawings, in which.

DETAILED DESCRIPTION OF THE INVENTION

Figure 1:
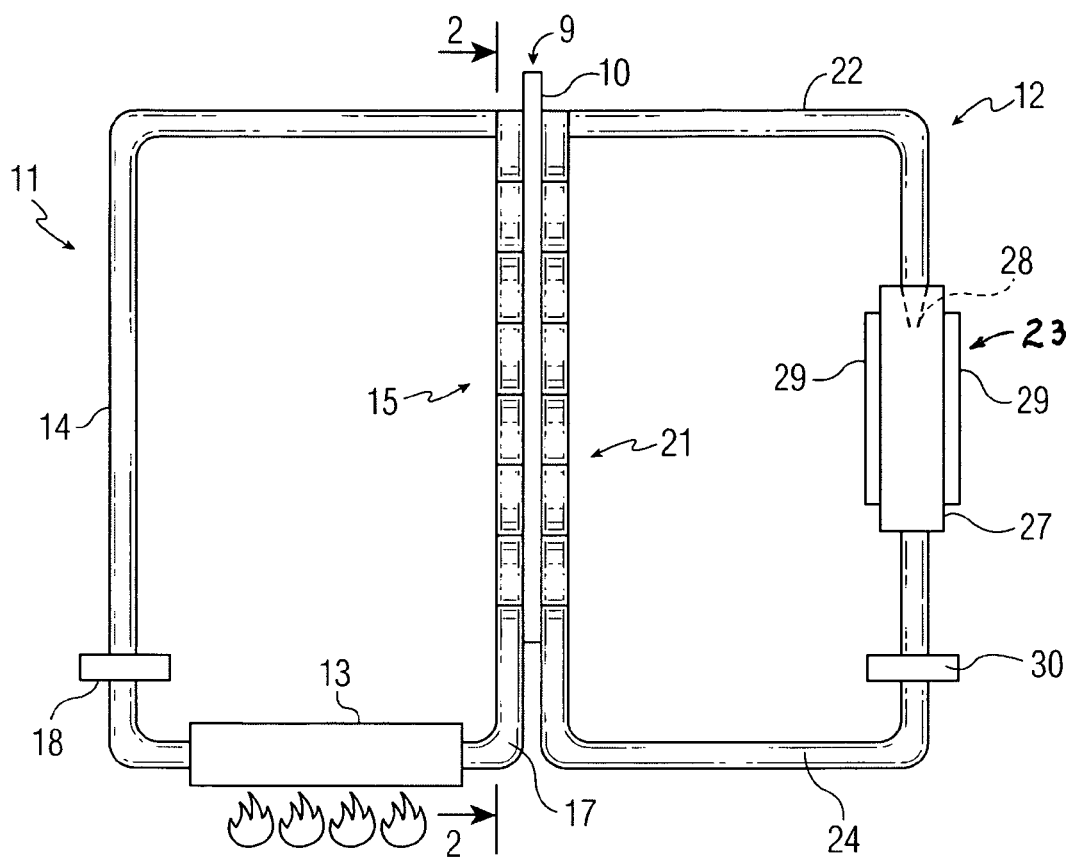
FIG. 1 is a schematic representation of an energy conversion installation according to the present invention, employing a heat exchanger incorporating a flat plate thermally conductive support.
Figure 2:
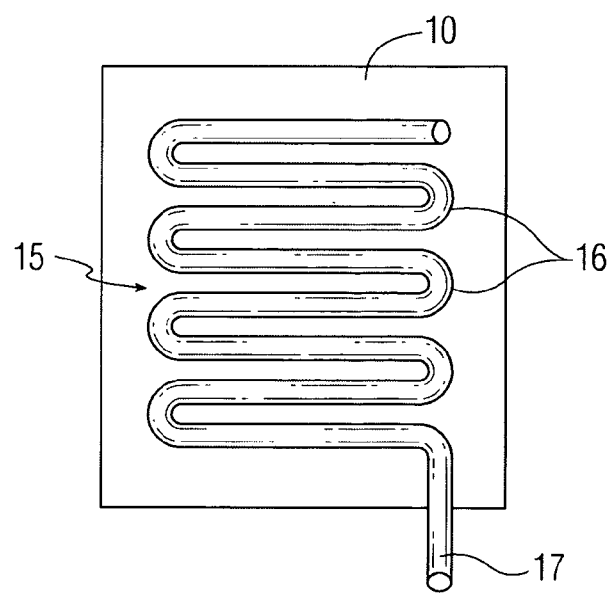
FIG. 2 is cross-sectional view taken along line 2-2 of FIG. 1.

Referring to FIGS. 1 and 2, an installation according to this invention presents a heat exchanger 9 including a flat plate 10 made of a material having good thermal conductivity, such as copper. At one side of plate 10 is a circuit 11 for providing heat energy. At the other side of plate 10 is an MHD circuit 12 including a conventional MHD electrode system.

Circuit 11 is a closed circuit filled with an appropriate liquid, such as oil or water. The circuit includes a heat source 13 for elevating the temperature of the liquid in the circuit. If the liquid is heated to boiling, steam will flow through the circuit. The heat source may be a fuel burner for burning a fuel such as oil, coal, or natural gas. Alternatively, heat source 13 may be derived from a geothermal source or may involve a solar collector of the type including an array of liquid-containing tubes. The heat source could be heat produced by any industrial process, including heat generated by a conventional power plant. In this way, the MHD device of the present invention could serve as a source of supplemental or even primary electricity at the site of the industrial process.

A conduit 14 extends from heat source 13 to a section for introducing heat to plate 10. The heat-introducing section is a sinuous pipe arrangement 15 defining a series of loops 16 fixed in good thermal contact to one face of plate 10. The end of looped pipe arrangement 15, opposite the end connected to conduit 14, is connected by a conduit 17 to heat source 13. As a result, there is a continuous closed circuit for liquid flow from heat source 13 through conduit 14, pipe arrangement 15, and conduit 17, back to heat source 13. In case it is needed to circulate the liquid through closed circuit 11, a pump 18 may be provided in the circuit.

Fixed in good thermal contact with the opposite face of plate 10 is a section for extracting heat from plate 10. The heat-extracting section is sinuous pipe arrangement 21, identical or similar to the arrangement 15. Suitable enclosures and heat insulation may be provided around the heat exchanger 9, i.e., around plate 10 and sections 15 and 21, as well as around other parts of the MHD device. One end of pipe arrangement 21 is connected by conduit 22 to the inlet end of a conventional MHD electrode system 23, the other end of which is connected by a conduit 24 to the end of sinuous pipe arrangement 21 opposite the end connected to conduit 22.

MHD electrode system 23 is shown schematically, and includes, as usual, a non-electrically-conductive enclosure 27 through which the ionized working fluid flows, and a nozzle 28 at one end for introducing the ionized plasma into enclosure 27. The pressure of the working fluid is preferably sufficient to create a supersonic flow through nozzle 28, since the faster the flow the more efficiently electricity is produced. Magnets 29 which are preferably super conductive magnets, extend along the length of enclosure 27 to create a field perpendicular to the longitudinal direction of the enclosure. Electrodes (not shown) are located within the enclosure in contact with the working fluid, and wires (not shown) extend from the electrodes to the exterior of enclosure 27 for tapping electricity.

In use, the oil or other liquid in circuit 11 is heated by the heat source 13 and moves along the circuit, either by convection or by means of pump 18. As the hot liquid flows through loops 16, the temperature of plate 10 is elevated.

The hot plate 10, in turn, heats the working fluid within sinuous pipe arrangement 21, located upstream of the MHD electrode system 23. The working fluid may be any suitable material known for this purpose, such as cesium or a suitable alloy, e.g., an alkali metal alloy, such as NaK, or combinations thereof. As the hot working fluid is introduced into container 27 through nozzle 28, the ionized plasma flowing through the magnetic field generates electrical energy, which is tapped to a location outside enclosure 27 by means of the electrodes within. The working fluid returns through conduit 24 to pipe arrangement 21, either by convection or with the use of a pump or compressor 30. Preferably, container 27 is arranged vertically, as illustrated in FIG. 1, so that gravity aids in moving the working fluid through the MHD electrode system.

Thus, by means of a simple heat exchanger 9, heat energy from any source can be used to heat the working fluid of an MHD conversion device so as to produce electrical energy.

Figure 3:
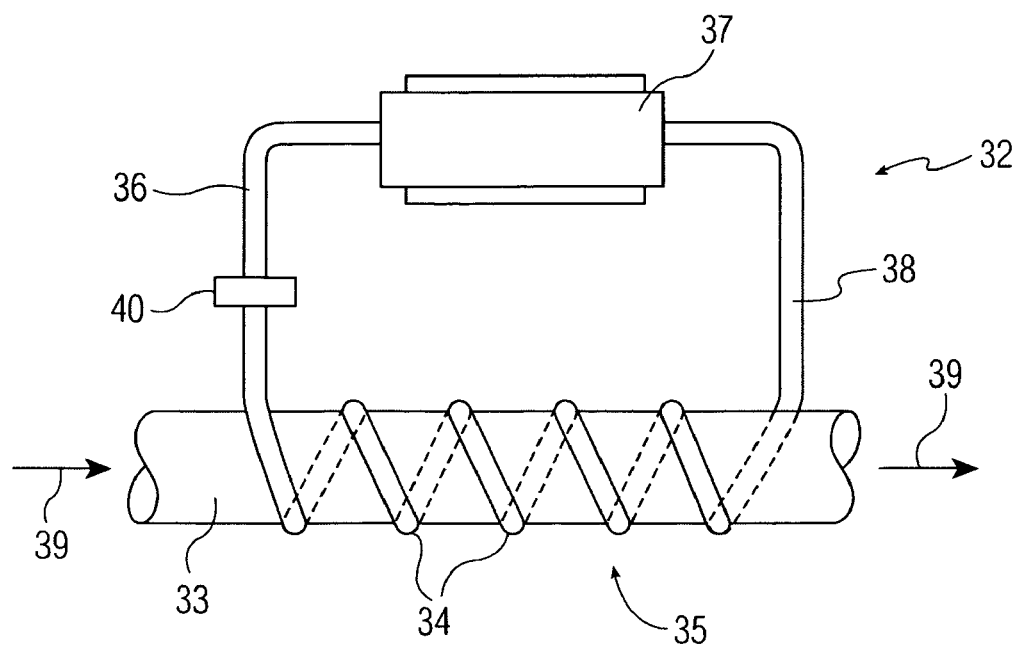
FIG. 3 is a schematic view of an energy conversion installation in which the conductive support of the heat exchanger is in the form of a thermally conductive tube.

Another embodiment of the invention is illustrated in FIG. 3. A cylindrical tube 33 is associated with a closed MHD circuit 32 including an MHD electrode system. The tube 33 is made of good thermally conductive material, such as a suitable metal, and is surrounded by a section for extracting heat from tube 33. The heat-extracting section comprises coiled loops 34 of a pipe 35, the pipe being in good thermal contact with tube 33. One end of pipe 35 is connected by conduit 36 to one end of a MHD electrode system 37, the other end of which is connected by a conduit 38 to the end of coiled pipe 35 opposite the end connected to conduit 36.

Tube 33 is connected to receive a hot fluid, typically a gas, which flows through the tube in the direction of arrows 39. It is contemplated that the hot gas flowing through tube 33 may contain waste heat, such as from an industrial process. Alternatively, the waste heat could be that produced by a vehicle engine, pipe 33 being part of the usual exhaust system of an automotive vehicle. A working fluid filling the closed circuit 32 is heated by contact of coils 34 with pipe 33, and circulates through circuit 32 either by convection or by means of pump 40. As the heated and ionized working fluid flows through MHD electrode system 37, electrical energy is generated, as described above.

Each of the circuits 11, 12, and 32 will be provided with access sites for filling the circuits with a suitable liquid, in the case of circuit 11, and a suitable working material, in the case of circuits 12 and 32. In addition, in case the working fluid leaving MHD electrode system 23 or 37 separates into different mediums, a branch parallel to conduit 24 or 38 may be included for returning the separate flows to pipe arrangement 21, where they are recombined.

Figure 4:
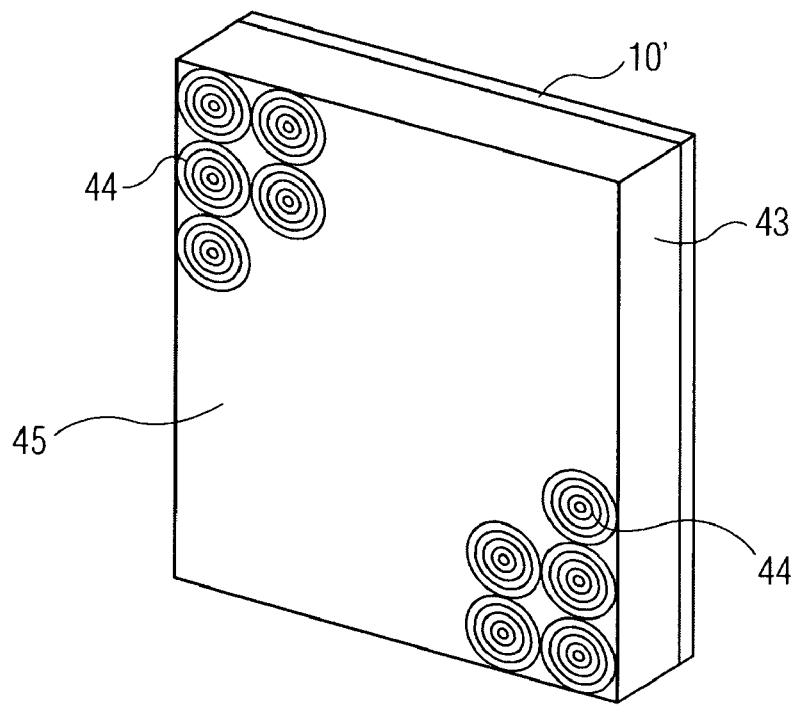
FIG. 4 is a perspective view of a lens arrangement mounted on one face of a heat exchanger support in the form of a flat plate.

FIG. 4 illustrates another embodiment of heat-providing means for the heat exchanger. In this case, mounted on one face of the heat-conductive heat exchanger plate 10', in place of pipe arrangement 15, is a box-like cover including a frame 43 projecting from the plate supporting a light-transmitting wall 45 which may be transparent or may carry a lens arrangement 44 for concentrating solar energy on to the plate to heat the latter. Any suitable type of lens arrangement may be employed, such as the Fresnel lenses illustrated. Although only a few lenses have been shown, it is understood that they will be provided over the entire surface of wall 45. If desired, a multi-aperture optical heat baffle arrangement may be provided adjacent to wall 45. The opposite face of plate 10 carries heat-extracting loops such as loops 21, which form part of an MHD circuit.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

The invention claimed is:

1. An energy conversion device for generating electricity, comprising
    (a) a heat exchanger including a conduit filled with and absorbing heat from a heating fluid as said heating fluid flows therethrough, and
    (b) a closed (magnetohydrodynamic) (MHD) circuit including
        (i) an MHD electrode system,
        (ii) a section for extracting heat from the heat exchanger, said section being thermally connected to said conduit for receiving heat from said conduit, and
        (iii) a flowable electrically-conductive material within the circuit, the temperature of the material being elevated as it flows through the heat-extracting section of the MHD circuit without coming into contact with said conduit and without said heat-extracting section of said MHD circuit coming into contact with said heating fluid.

2. An energy conversion device as described in claim 1 wherein the flowable material is capable of being ionized by the heat extracted from the heat exchanger.

3. An energy conversion device as described in claim 2 wherein the material flows through the closed MHD circuit in one direction, and the heat-extracting section of the circuit is located upstream of the electrode system.

4. An energy conversion device as described in claim 1 wherein the heat exchanger includes a heat-conductive support mounted between said conduit and said heat-extracting section of said MHD circuit, said support adapted to be heated by the heat of said heating fluid transmitted through said conduit, the heat extracting section of the MHD circuit being adapted to extract heat from the support.

5. An energy conversion device for generating electricity, comprising
    (a) a heat exchanger including means for providing heat to the heat exchanger from a heat source, wherein the heat exchanger includes a heat-conductive support adapted to be heated by the heat-providing means, and the heat a liquid, and of the liquid extracting section of the MHD circuit being adapted to extract heat from the support,
    (b) a closed magnetohydrodynamic (MHD) circuit including
        (i) an MHD electrode system,
        (ii) a section for extracting heat from the heat exchanger, and
        (iii) a flowable electrically-conductive material within the circuit, the temperature of the material being elevated as it flows through the heat-extracting section of the MHD circuit,
    wherein the support comprises a metal plate having two opposite faces.

6. An energy conversion device as described in claim 5 wherein the heat-extracting section of the MHD circuit includes a sinuous pipe arrangement in heat-conductive contact with one face of the plate.

7. An energy conversion device as described in claim 6 wherein the heat-providing means comprises a closed circuit, the heat-providing circuit having a heat-introducing section including a sinuous pipe arrangement in heat-conductive contact with the opposite face of the plate.

8. An energy conversion device as described in claim 7 wherein the heat-providing circuit contains a liquid, and including means for burning a combustible fuel to elevate the temperature of the liquid.

9. An energy conversion device as described in claim 7 wherein the heat-providing circuit contains including means for elevating the temperature using waste heat.

10. An energy conversion device for generating electricity, comprising
 (a) a heat exchanger including means for providing heat to the heat exchanger from a heat source, wherein the heat exchanger includes a heat-conductive support adapted to be heated by the heat-providing means, and the heat a liquid, and of the liquid extracting section of the MHD circuit being adapted to extract heat from the support,
 (b) a closed magnetohydrodynamic (MHD) circuit including
 (i) an MHD electrode system,
 (ii) a section for extracting heat from the heat exchanger, and
 (iii) a flowable electrically-conductive material within the circuit, the temperature of the material being elevated as it flows through the heat-extracting section of the MHD circuit,
 wherein the support comprises a metal tube having an inner surface and an outer surface, the heat providing means heating one of the tube surfaces, and the heat-extracting section of the MHD circuit being in heat-conductive contact with the other tube surface.

11. An energy conversion device as described in claim 10 wherein the heat providing means includes means for directing hot gas through the tube.

12. An energy conversion device as described in claim 11 wherein the hot gas incorporates waste heat from an industrial process.

13. An energy conversion device as described in claim 11 wherein the hot gas is exhaust gas from an automotive engine.

14. An energy conversion device as described in claim 10 wherein the heat-extracting section of the MHD circuit includes a helical pipe surrounding the tube.

15. An energy conversion device as described in claim 5 wherein the heat-providing means includes a lens arrangement for concentrating solar radiation on one face of the plate.

16. An energy conversion device as described in claim 15 wherein the heat-extracting section of the MHD circuit includes a sinuous pipe arrangement in heat-conductive contact with the opposite face of the plate.

17. An energy conversion device as described in claim 1 including means for pumping the flowable material through the MHD circuit, and wherein the MHD electrode system is oriented vertically so that flow of the material therethrough is in a downward direction.

* * * * *

UNITED STATES PATENT AND TRADEMARK OFFICE
CERTIFICATE OF CORRECTION

| | | |
|---|---|---|
| PATENT NO. | : 7,554,223 B1 | Page 1 of 1 |
| APPLICATION NO. | : 11/478065 | |
| DATED | : June 30, 2009 | |
| INVENTOR(S) | : Kay | |

It is certified that error appears in the above-identified patent and that said Letters Patent is hereby corrected as shown below:

In Claim 5, at column 4, lines 44-45, delete "a liquid, and of the liquid";

In Claim 9, at column 5, line 6, after "contains" insert --a liquid, and--;

in line 7, after "temperature" insert --of the liquid--;

In Claim 10, at column 5, lines 13-14, delete "a liquid, and of the liquid"

Signed and Sealed this
Fifteenth Day of March, 2011

David J. Kappos
*Director of the United States Patent and Trademark Office*